(12) United States Patent
Rigoselli et al.

(10) Patent No.: US 9,209,616 B2
(45) Date of Patent: Dec. 8, 2015

(54) POWER SUPPLY CIRCUIT FOR ON BOARD ENERGY SOURCE OR STORAGE DEVICE AND PARTICULARLY FOR SUPER-CAPACITOR STORAGE UNIT

(71) Applicant: ALSTOM TRANSPORT SA, Levallois-Perret (FR)

(72) Inventors: Massimo Rigoselli, Arluno (IT); Davide Mainardi, Milan (IT); Davide Colombo, Seveso (IT)

(73) Assignee: ALSTOM TRANSPORT SA, Levallios-Perret (FR)

( * ) Notice: Subject to any disclaimer, the term of this patent is extended or adjusted under 35 U.S.C. 154(b) by 237 days.

(21) Appl. No.: 13/896,565

(22) Filed: May 17, 2013

(65) Prior Publication Data
US 2013/0314823 A1 Nov. 28, 2013

(30) Foreign Application Priority Data
May 22, 2012 (EP) ..................................... 12168828

(51) Int. Cl.
*H02H 3/16* (2006.01)
*H02H 7/16* (2006.01)

(52) U.S. Cl.
CPC .. *H02H 3/16* (2013.01); *H02H 7/16* (2013.01)

(58) Field of Classification Search
CPC ....... H01H 83/14; H02H 1/0015; H02H 3/16; H02H 7/16
USPC ............................................................ 361/42
See application file for complete search history.

(56) References Cited

U.S. PATENT DOCUMENTS 3,984,734 A 10/1976 Becker
2009/0015199 A1* 1/2009 Kitanaka ....................... 320/118

FOREIGN PATENT DOCUMENTS

| JP | 4190624 | 7/1992 |
| JP | 2002159135 | 5/2002 |
| JP | 2003244837 | 8/2003 |

* cited by examiner

*Primary Examiner* — Thienvu Tran
*Assistant Examiner* — Kevin J Comber
(74) *Attorney, Agent, or Firm* — Themis Law

(57) ABSTRACT

A power supply circuit for an on board energy source or storage device, and particularly for a super-capacitor storage unit having a plurality of interconnected super-capacitors and a first and a second terminal, includes a positive bus connecting the first terminal to a positive pole of a DC high voltage feeding source and a negative bus connecting the second terminal to a negative pole of the high voltage feeding source; and means for disconnecting the super-capacitor storage unit from the high voltage feeding source after detecting circulating fault currents due to insulation losses to ground, which include a high speed circuit breaker and a differential relay that are connected in series along the negative bus, between the second terminal and a grounding point, the differential relay generating an activation signal of the high speed circuit breaker in response to the circulation of a fault current.

6 Claims, 1 Drawing Sheet

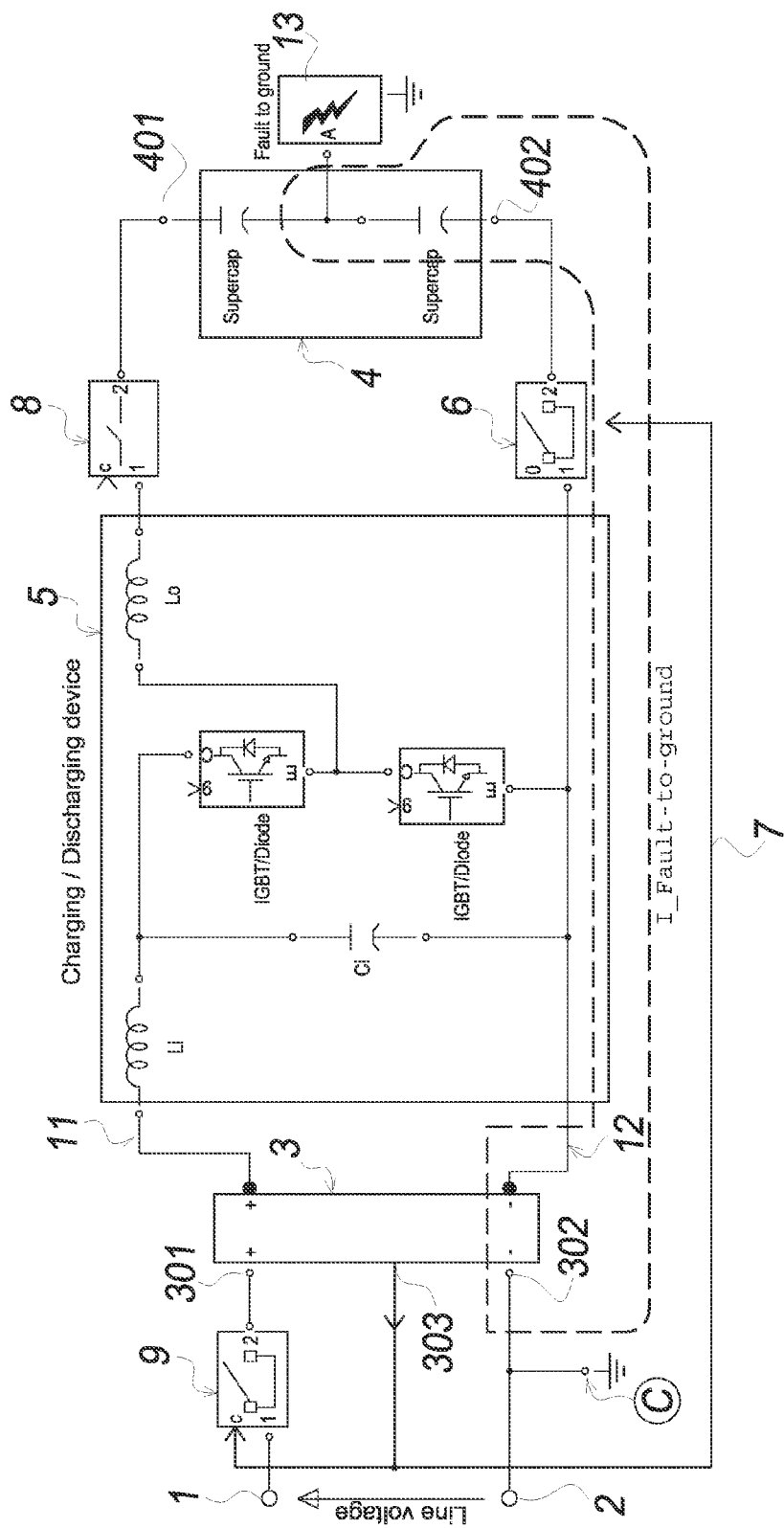

POWER SUPPLY CIRCUIT FOR ON BOARD ENERGY SOURCE OR STORAGE DEVICE AND PARTICULARLY FOR SUPER-CAPACITOR STORAGE UNIT

FIELD OF THE INVENTION

The invention relates to a power supply circuit for an on board energy source or storage device, and particularly for super-capacitor storage units having a plurality of super-capacitors interconnected one to the other and a first and a second terminal The circuit includes a positive bus connecting the first terminal of the super-capacitor storage unit to a positive pole of a direct current (DC) high voltage feeding source, and a negative bus connecting the second terminal of the super-capacitor storage unit to a negative pole of the DC high voltage feeding source, the negative bus being connected to ground at a certain grounding point. The circuit further includes means for disconnecting the super-capacitor storage unit from the high voltage feeding source in response to the detection of fault currents circulation due to insulation losses to ground of the super-capacitor storage unit.

BACKGROUND OF THE INVENTION

In on board energy source or storage devices, and particularly in super-capacitor power devices according to the prior art, the protection against fault currents due to insulation losses of the storage module to ground is usually performed by using a high speed circuit breaker on the positive high voltage bus and a fuse on the negative high voltage bus. This solution is critical because relatively high impedance may limit the short circuit current to a value lower than the fuse threshold. The fuse threshold is mandatorily sized over the relatively high thermal current. These kinds of short circuits are particularly dangerous as they may not immediately result in a large current and therefore are less likely to be detected. As a consequence, current can circulate producing damage to the devices or even fire due to overheating.

For the above reasons, a fuse is not suitable for detecting and breaking fault currents of the same magnitude of operating currents under normal conditions, thus relatively low currents can circulate for a long time producing damage to devices or even fire without being detected.

In the following description and in the claims, for the sake of simplicity the term super capacitor power unit or super-capacitor storage unit are used to indicate whichever kinds of on board power devices for storing and supplying electric energy to a load consisting principally, but not in a limiting way, in electric motors of the bogie of a locomotive.

Energy storage systems, such as super-capacitor energy storage systems or other kinds of on board power devices are of great interest for railway vehicles since they allow regulating and reducing energy consumption of such vehicles up to a considerably large extent. Ensuring their safe operation is an important issue, particularly in the field of transportation and specifically in railway vehicles.

Since the components of such electric power storage units are charged to high voltage differences, they are sensitive to losses of insulation to ground so that fault currents can be generated.

SUMMARY OF THE INVENTION

The present invention aims at avoiding the circulation of dangerous currents in the case of loss of insulation to ground and other faults having similar effects. More particularly, the present invention aims at overcoming the drawbacks of known power supply circuits deriving from the use of a simple fuse, which is not suitable to detect and break fault currents under the current threshold that is needed to burn the fuse, particularly fault currents of the same magnitude as the normal operating currents.

The present invention achieves the above mentioned aims by providing a power supply circuit for an on board energy source or storage device, and particularly for a super-capacitor storage unit having a plurality of super-capacitors interconnected one to the other and a first and a second terminal. The circuit includes a positive bus connecting the first terminal of the super-capacitor storage unit to a positive pole of a DC high voltage feeding source and a negative bus connecting the second terminal of the super-capacitor storage unit to a negative pole of the DC high voltage feeding source, the negative bus being connected to the ground at a certain grounding point. The circuit further includes means for disconnecting the super-capacitor storage unit from the high voltage feeding source in response to the detection of circulating fault currents due to insulation losses to ground of the super-capacitor storage unit. Such means for disconnecting the super capacitor storage unit from the high voltage feeding source include a high speed circuit breaker and a differential relay, which are connected in series along the negative bus, between the second terminal and the grounding point, the differential relay being connected also in series in the positive bus and capable of generating an activation signal of the high speed circuit breaker in response to circulation of a fault current detected by measuring the differences of the currents in the positive and in the negative bus.

The adoption of a high speed circuit breaker on the negative high voltage feeding bus allows an automatic intervention in case of a high current while, in case of a low current, the intervention is managed by differential relay.

Whichever kind of ground fault is detected by the differential relay causes the circuit breaker to open. In case of a high fault current the circuit breaker's intrinsic tripping device will cause its opening as well. By installing the differential relay and the circuit breaker between the negative high voltage bus grounding point and the negative terminal of the super-capacitors pack, the invention allows detecting any kinds of fault and opening the feeding line correspondingly, thereby insulating the super-capacitor storage unit from the DC High Voltage source.

The adoption of a circuit breaker instead of a fuse can effectively prevent dangerous conditions when relatively low currents can circulate for a long time producing damage to devices or even fire without the possibility of detection.

An arrangement according to the present invention also causes moderate cost increases, because usually, in power supply circuits according to the prior art, a differential relay is already provided and the state of the art solutions adopt a high speed circuit breaker in the positive bus and a fuse in the negative bus. Instead, in an arrangement according to the present invention the high speed circuit breaker is provided in the negative bus and the fuse is no longer necessary. Furthermore, a high speed circuit breaker is no longer needed on the positive bus.

According to an embodiment of the present invention, a simple disconnecting device may be provided on the positive bus in order to ensure the same safety disconnection as the prior art solutions. This disconnecting device, however, is not required at all for breaking fault currents.

The features of the present invention and the advantages thereof will be described with more detail by means of an embodiment of a power supply circuit and of the annexed FIG. 1 representing a scheme of the circuit.

BRIEF DESCRIPTION OF THE DRAWINGS

The embodiment of FIG. 1 is directed to a power supply circuit for super-capacitor storage units, and may be applied as such or with minor modifications based on other kinds of on board power storage devices, particularly for railway applications or similar.

DETAILED DESCRIPTION OF EMBODIMENTS OF THE INVENTION

Referring to FIG. 1, a power supply circuit for charging/discharging a super-capacitor power storage unit comprises a positive and a negative bus which have respectively an input terminal 1 and 2, between which the feeding line voltage of a DC high voltage power supply is applied. A differential relay 3 is inserted in the positive and negative bus line 11 and 12.

The positive and negative bus lines 11 and 12 are connected respectively to the positive and to the negative input terminals 401 and 402 of a super-capacitor power storage unit 4 by means of a charging/discharging device, indicated generally by 5, which is not described in greater detail since it is known in the art and is not a part of the present invention.

The negative bus line 12 is connected to ground at a point (C), which is between the input terminal 2 and the differential relay input 302. The driving output 303 of the differential relay 3 is connected to the driving input of a high speed circuit breaker 6 by a command line 7. The high speed circuit breaker 6 is inserted in the negative bus line 12 between the output of the charging/discharging device 5 and the negative input terminal 402 of the super-capacitors power storage unit 4.

The command line 7 may also connect a high speed circuit breaker 9, which may be provided in the positive bus line 11 between the input terminal 1 of the power supply circuit and the input 301 of the differential relay 3.

A disconnector 8 may be provided in the positive bus 11 between the positive output of the charging/discharging device 5 and the positive input terminal 401 of the super-capacitor power storage unit 4.

The block 13 indicates the occurrence of a fault to ground due to insulation losses to ground of the super-capacitor power storage unit 4. The unit 4 can be any kind of electric active load and particularly an energy storage device or an electric motor.

Referring further to FIG. 1, it is clear that whichever kind of ground fault 13 is detected by the differential relay 3, a driving signal is generated which causes the circuit breaker 6 to open the negative bus line 12. The differential relay 3 measures the difference of the currents flowing in the positive and negative bus lines 11 and 12 at the input of the charging/discharging device 5. By this arrangement, dangerous currents being generated in case of insulation losses of the super-capacitors are detected and their circulations are prevented.

In case of high fault current, the circuit breaker intrinsic tripping device will cause its opening as well. As it is known to the skilled person, each circuit breaker unit is provided with an electromechanical device which is used to bring the circuit breaker to its off or open position when certain abnormal electrical conditions occur, for example an abnormally high current which is detected by the electromechanical device and which drives the tripping of the circuit breaker.

In high voltage DC power supplies, the present invention considers fault currents of an intensity above the differential relay threshold (typical value for traction about 80 Amperes).

It must be appreciated that in order to detect any kinds of fault currents and open the feeding bus circuit, the differential relay 3 and the circuit breaker 6 need to be installed between grounding point (C) of the negative high voltage bus line and the corresponding negative input terminal 402 of the super-capacitor pack 4.

The dashed line I Fault-to-ground in FIG. 1 shows a possible path of a fault current, which can be generated due to an insulation loss of a super-capacitor of the super-capacitor storage unit 4. If the current value is above a certain threshold of the differential relay 3, then the differential relay will control the electromechanical tripping device of the high speed circuit breaker 6, causing the tripping of the circuit breaker. If the current intensity is very high, there will be also a direct response of the tripping device of the circuit breaker 6, determining a tripping action.

In order to get the same safety disconnection as in prior art solutions, the simple disconnecting device 8 may be foreseen on the positive high voltage bus. It should be noted that the disconnecting device 8 is not required to be able to break fault currents.

Furthermore, a second high speed circuit breaker 9 may also be provided as shown in FIG. 1. The second high speed circuit breaker 9 is also driven by the differential relay 3 and has the function of breaking faults in the charging/discharging device only. Thus, as it appears clearly from the embodiment of FIG. 1, the circuit according to the present invention cannot be considered at all a symmetrization, on the negative bus, of a known configuration adopted on the positive bus according to the prior art. One aspect of the present invention consists in placing a high speed circuit breaker 6 actuated by a differential relay 3 on the negative bus and in a specific position, between a charging/discharging device, more precisely between the grounding point indicated by (C) of the negative bus and the super-capacitor storage unit on the negative pole.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become apparent to those skilled in the art and the scope of the present invention is limited only by the appended claims.

The invention claimed is:

1. A power supply circuit for an on board energy source or storage device, and particularly for a super-capacitor storage unit having a plurality of super-capacitors interconnected to one another and a first and a second terminal, the power supply circuit comprising:
    a positive bus connecting the first terminal of the super-capacitor storage unit to a positive pole of a DC high voltage feeding source;
    a negative bus connecting the second terminal of the super-capacitor storage unit to a negative pole of the DC high voltage feeding source, the negative bus being connected to ground at a grounding point downstream of the DC high voltage feeding source; and
    a disconnecting device configured to disconnect the super-capacitor storage unit from the DC high voltage feeding source in response to detection of fault current circulation due to insulation losses to the ground of the super-capacitor storage unit,
    wherein the disconnecting device comprises a high speed circuit breaker and a differential relay which are connected in series only along the negative bus, and wherein, between the second terminal and the grounding point, the differential relay is further connected in series in the positive bus and is configured to generate an activation signal of the high speed circuit breaker in response to the fault current circulation detected by measuring differences in currents in the positive and in the negative bus.

2. The power supply circuit according to claim 1, further comprising a second disconnecting device on the positive bus which is configured to disconnect the super-capacitor storage unit only from the positive pole of the DC high voltage feeding source.

3. The power supply circuit according to claim 1, further comprising a first device configured to detect fault currents having an intensity higher than a predetermined threshold and a second device configured to detect fault currents having an intensity lower than a predetermined threshold, the first and second devices configured to detect fault currents driving the high speed circuit breaker when a fault current is detected.

4. The power supply circuit according to claim 3, wherein the first device configured to detect fault currents comprises a tripping device of the high speed circuit breaker, and wherein the second device configured to detect fault currents comprises a differential relay driving the high speed circuit breaker.

5. The power supply circuit according to claim 1, further comprising:
 a positive and a negative input terminal for the DC high voltage feeding source; and
 the positive and the negative bus connecting the DC high voltage feeding source to the first and to the second terminals of the super-capacitor storage unit,
 wherein, on the negative bus, the negative input terminal is connected to the ground and to a first input of the differential relay, and the positive input terminal is connected to a second input of the differential relay, and
 wherein a negative output of the differential relay is connected to the high speed circuit breaker interposed between the differential relay and the second terminal of the super-capacitor storage unit.

6. The power supply circuit according to claim 5, further comprising a charging/discharging unit interposed between the differential relay and the high speed circuit breaker on the negative bus.

* * * * *